(12) United States Patent
Vicari et al.

(10) Patent No.: US 8,728,593 B2
(45) Date of Patent: *May 20, 2014

(54) POLYVINYL ALCOHOL FILMS WITH IMPROVED RESISTANCE TO OXIDIZING CHEMICALS

(75) Inventors: Richard Vicari, Pearland, TX (US); Bret F. Hann, San Antonio, TX (US)

(73) Assignee: Sekisui Specialty Chemicals America, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/800,576

(22) Filed: May 18, 2010

(65) Prior Publication Data

US 2010/0234492 A1     Sep. 16, 2010

Related U.S. Application Data

(62) Division of application No. 11/415,768, filed on May 2, 2006, now Pat. No. 7,745,517.

(51) Int. Cl.
    *C08K 5/07*     (2006.01)
(52) U.S. Cl.
    USPC ............... 428/35.2; 524/56; 524/58; 525/56; 428/35.7
(58) Field of Classification Search
    USPC .................. 524/56, 58; 525/56; 428/35.2
    See application file for complete search history.

(56) References Cited

U.S. PATENT DOCUMENTS

| 3,983,254 A | * | 9/1976 | Alterman et al. | 428/403 |
| 4,289,815 A | * | 9/1981 | Lee | 428/35.4 |
| 4,828,744 A | * | 5/1989 | Kaufmann et al. | 510/296 |
| 5,534,178 A | * | 7/1996 | Bailly et al. | 510/367 |
| 6,166,117 A | | 12/2000 | Miyazaki | 524/291 |
| 6,608,121 B2 | | 8/2003 | Isozaki et al. | 524/47 |
| 6,787,512 B1 | | 9/2004 | Verrall et al. | 510/293 |
| 6,818,709 B1 | | 11/2004 | Vicari | 526/65 |
| 6,821,590 B2 | | 11/2004 | Verrall et al. | 428/35.7 |
| 6,956,070 B2 | | 10/2005 | Fujiwara et al. | 524/47 |
| 7,005,168 B2 | | 2/2006 | Verrall et al. | 428/35.7 |
| 7,563,757 B2 | * | 7/2009 | Kouvroukoglou et al. | 510/296 |
| 7,745,517 B2 | * | 6/2010 | Vicari et al. | 524/56 |

(Continued)

FOREIGN PATENT DOCUMENTS

| GB | 1103762 A | * | 10/1963 |
| JP | 61228057 A | * | 10/1986 |

(Continued)

OTHER PUBLICATIONS

Derwent Abstract of JP 61-228057 A, 1988.*

(Continued)

*Primary Examiner* — Nicole M Buie-Hatcher
(74) *Attorney, Agent, or Firm* — Michael W. Ferrell; Ferrells, PLLC; Anna L. Kinney

(57) ABSTRACT

A water-soluble film which comprises a saccharide component and a vinyl alcohol resin component, where the vinyl alcohol resin may include functional comonomer units such as sulfonic acid functional groups or salts thereof. Preferred are polyvinyl alcohol/2-methylacrylamido-2 methyl propane sulfonic acid resins (PVOH/AMPS) which may be purchased commercially with relatively higher or relatively lower characteristic viscosity. The films exhibit superior resistance to aggressive oxidizing chemicals and remain soluble in water after prolonged exposure thereto. The films are particularly useful for unit-dose packaging of chlorine-containing pool chemicals, such as trichloroisocyanuric acid.

8 Claims, 10 Drawing Sheets

(56) References Cited

U.S. PATENT DOCUMENTS

| | | | |
|---|---|---|---|
| 7,786,229 B2 * | 8/2010 | Vicari | 526/65 |
| 2002/0037946 A1 | 3/2002 | Isozaki et al. | 523/128 |
| 2002/0182348 A1 * | 12/2002 | Fujiwara et al. | 428/35.2 |
| 2005/0065272 A1 | 3/2005 | Vicari | 524/557 |
| 2005/0155936 A1 * | 7/2005 | Martin et al. | 210/754 |
| 2005/0222355 A1 | 10/2005 | Vicari | 526/330 |

FOREIGN PATENT DOCUMENTS

| | | | | |
|---|---|---|---|---|
| JP | 07-118407 | 5/1995 | | C08J 5/18 |
| JP | 10-324785 | 12/1998 | | |
| JP | 2002020569 A * | 1/2002 | | |
| JP | 2003-104435 | 4/2003 | | |
| JP | 2003-104436 | 4/2003 | | |
| JP | 2003-105105 | 4/2003 | | |
| JP | 2005139240 A | 6/2005 | | |

OTHER PUBLICATIONS

Machine translation of JP 2002-020569, retrieved Jan. 4, 2011.*
Machine translation of JP 2005-139240.*
Japanese Office Action, Mar. 19, 2013.
Lewis, R., "Hawley's Condensed Chemical Dictionary", 1993, Van Nostrand Reinhold, 12th edition, pp. 542, 564, 79, 725, 726, 877, 976, 977 and 1099.

* cited by examiner

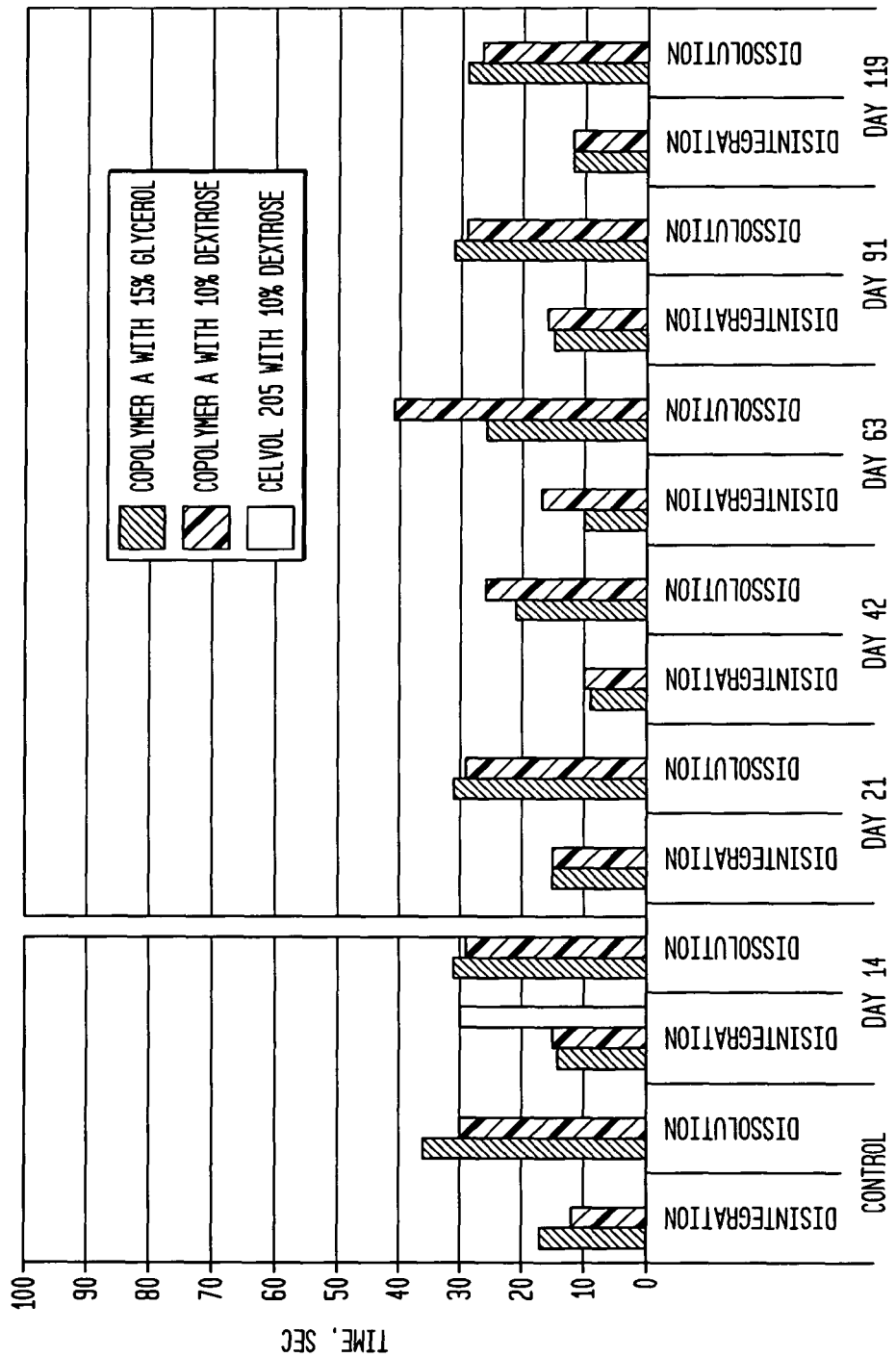

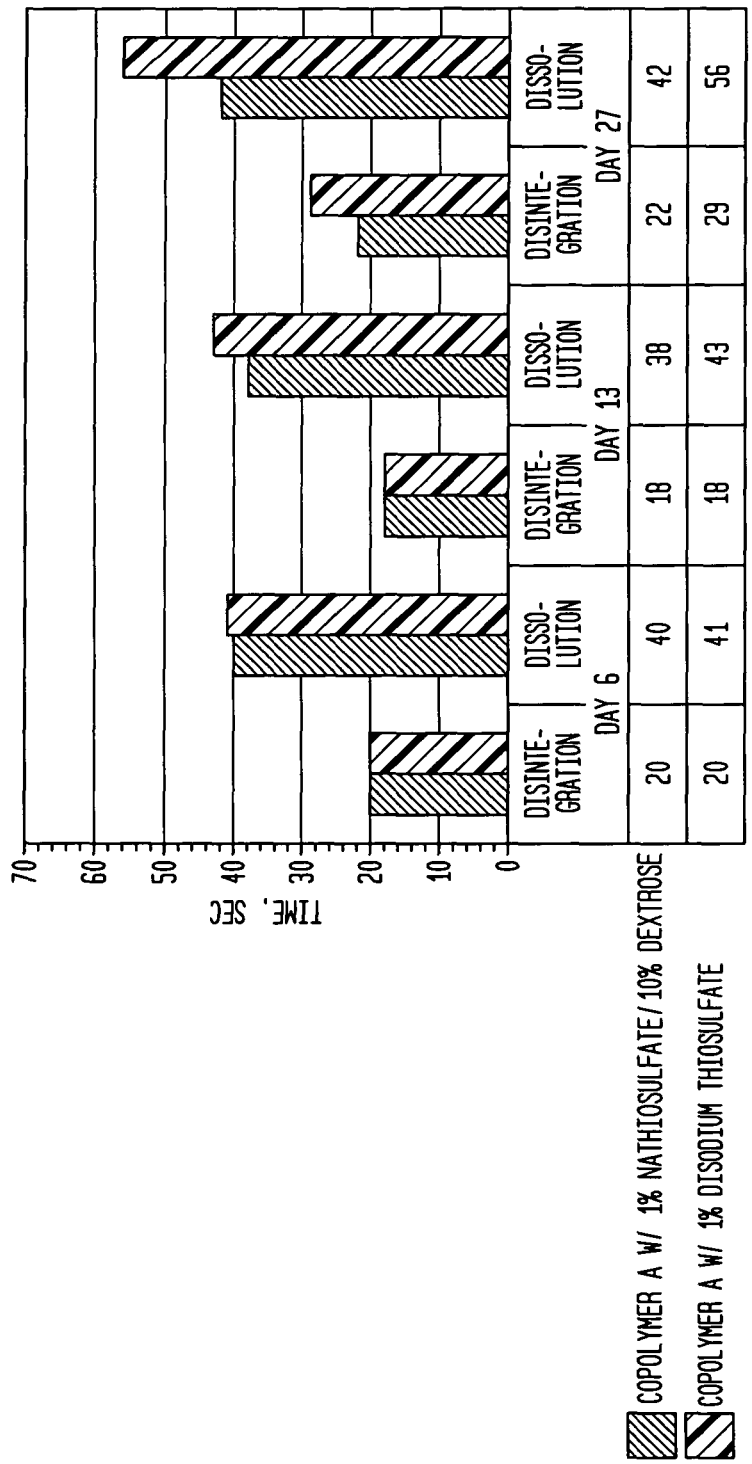

US 8,728,593 B2

POLYVINYL ALCOHOL FILMS WITH IMPROVED RESISTANCE TO OXIDIZING CHEMICALS

CLAIM FOR PRIORITY

This non-provisional application is a divisional application of U.S. patent application Ser. No. 11/415,768, filed on May 2, 2006, also entitled, "Polyvinyl Alcohol Films with Improved Resistance to Oxidizing Chemicals", now U.S. Pat. No. 7,745,517. The priority of U.S. patent application Ser. No. 11/415,768 is hereby claimed and its disclosure incorporated into this application by reference.

TECHNICAL FIELD

The present invention relates to soluble polyvinyl alcohol (PVOH) based films that exhibit improved resistance to aggressive oxidizing chemicals, and the use of those films for novel applications such as unit dose packaging for pool chemicals.

BACKGROUND

It is known in the art to package chemical agents in water soluble unit dose packages, whereby a package is thrown into water so that the contents disperse in the water as the packaging film dissolves. Water soluble unit dose packaging is advantageous in applications which employ hazardous chemicals as are found in, for example, agrochemicals, bleaching agents, laundry detergents, industrial chemicals, pool chemicals, and the like. Water soluble packaging allows a user to employ the hazardous substances without coming into direct contact with dangerous chemicals. Additionally, unit dose packaging obviates the need for the user to measure the chemicals since each dose is pre-packaged.

Polyvinyl alcohol (PVOH) films have been used in the art to form unit dose packages, because the films exhibit good strength, impact resistance, and are soluble in water. Unfortunately, however, the solubility of PVOH films rapidly decreases when they are exposed to certain chemicals such as oxidizing chemicals, acid chemicals, alkali chemicals, chlorine-containing substances, salts with polyvalent metals, boric acid, polyamines, insecticides, herbicides, among others. Thus, in applications which employ these types of chemicals, the use of PVOH packaging is impractical as the effective shelf-lives of the unit dose products are limited by their solubility in water.

Various approaches to improve the chemical resistance of PVOH films are described in the art. U.S. Pat. No. 6,956,070 to Fujiwara et al. entitled "Water-Soluble Film and Package Using the Same," describes a water-soluble polymer film for use as unit dose packaging where the film includes a polyvinyl alcohol copolymer which contains N-vinylamide monomer units in amounts of from 1 to 10 mol percent. The PVOH copolymer may further include carboxyl functional groups or alkali metal salts thereof.

U.S. Pat. No. 6,608,121 to Isozaki et al. entitled "Water-Soluble Resin Composition and Water-Soluble Film" discloses a PVOH based film for unit dose packaging, where the PVOH resin is formulated with a plasticizer and a starch component. The films in Isozaki et al. are reported to exhibit good physical properties and have acceptable water solubility after prolonged exposure to alkali substances.

U.S. Pat. No. 6,166,117 to Miyazaki entitled "Water-Soluble Film" relates to a film for packaging chemical substances, where the film includes a polyvinyl alcohol copolymer which contains sulfonic acid functional monomer units, which are typically acrylamido-2-methylpropanesulfonate (AMPS) units. The film further includes gallic acid or salts of gallic acid. According to Miyazaki, the water-solubility of the films does not diminish with prolonged exposure to acidic chemicals, chlorine-containing chemicals, or agricultural chemicals.

A similar approach is disclosed in Japanese Abstract 7-118407 to Miyazaki entitled "Agricultural Packaging Film" which discloses water-soluble unit dose packaging which includes a polyvinyl alcohol resin that is modified with sulfonic acid containing monomers. The sulfonic acid units are preferably AMPS monomers or salts thereof, and may be included in the copolymer in amounts of from 0.1 to 20 mole percent.

U.S. Pat. No. 6,787,512 to Verrall et al. entitled "Water-Soluble Copolymer Film Packet," relates to a water-soluble film which includes a vinyl alcohol copolymer. The copolymers in Verrall et al. may include either carboxylate functional units or sulfonate functional units, and the films are stated to be useful as unit dose packaging for liquid laundry detergents.

The use of sulfonic acid modified PVOH films for packaging hypochlorite salts and harsh acids is described in copending U.S. application Ser. No. 11/147,910 to Vicari entitled "Vinyl Alcohol Copolymers for Use in Aqueous Dispersions and Melt Extruded Articles" (US Patent Application Publication No. 2005/0222355). According to that application, the modified PVOH copolymer is generally produced according to a unique process which allows for a high content of polymerized AMPS in the polymer backbone.

Other references of interest include U.S. Pat. Nos. 6,821,590 and 7,005,168, both to Verrall et al.

While the above noted approaches provide improved films for use with certain chemicals, the present Applicants have discovered that many of the modified films still exhibit a rapid reduction in solubility when exposed to aggressive oxidizing agents, and in particular chemicals that are useful for chlorinating water such as chlorinated isocyanurates. When exposed to these types of compounds, most PVOH film formulations (including those with PVOH copolymers) show a significant decline in water solubility, in some cases becoming effectively insoluble in less than a week. This is unacceptable for most unit dosing applications, where shelf-lifes of two months or more may be desired. Accordingly, there exists a need for a polymeric film which has excellent water solubility even after prolonged exposure to aggressive oxidizing agents. Further, the film should exhibit good strength properties and should resist discoloration over time.

SUMMARY OF THE INVENTION

Accordingly, there is provided by the present invention a polymeric film formulation which may be formed into unit dose packaging for oxidizing chemicals. The inventive film packaging maintains excellent water solubility even after prolonged contact with highly oxidative chemical agents, such as chlorine-containing pool chemicals. As illustrated in FIG. 1 of this application, films produced according to the invention are surprisingly resistant to trichloroisocyanuric acid sanitizer, exhibiting solubility for two months or more, whereas conventional films become insoluble after only one or two weeks of exposure.

According to one aspect of the present invention there is provided a polyvinyl alcohol film that is resistant to an oxidizing chemical, wherein the film comprises from 60 to 99 weight percent of a vinyl alcohol copolymer which includes from 0.5 to 20 mole percent of functional comonomer units, where the comonomer units are effective to stabilize the solubility of the film upon prolonged exposure (6+ days) to an oxidizing chemical, and further includes from 1 to 40 weight percent of a saccharide component that comprises at least one water soluble saccharide. The comonomer units in the film may be selected and included in amounts such that the film has elevated solubility in water after like exposure to the oxidizing chemical, as compared to a like film made using a like vinyl alcohol resin (i.e., similar degree of polymerization and degree of hydrolysis) which has none of the functional comonomer units. Like exposure refers to the exposure for substantially the same time of substantially the same oxidizing agent (including concentration) at substantially the same temperature. A like film without functional monomer units and/or without saccharide is substantially identical in all other respects (thickness and so forth), wherein the functional comonomer or saccharide is replaced with polyvinyl alcohol.

Preferably, the saccharide component is selected and included in amounts such that the film exhibits elevated solubility in water after like exposure to the oxidizing chemical as compared to a like film which does not include the saccharide component. More preferably, both the functional comonomer units and the saccharide component are selected and included in amounts so that the film has elevated water solubility after like exposure to the oxidizing chemical as compared with either (1) a like film made with a like vinyl alcohol resin having no comonomer units, or (2) a like film made without the saccharide component.

The oxidizing chemical may be selected from the group consisting of hypochlorites, chlorinated and/or brominated isocyanurates, chlorates, perchlorates, bromates, perbromates, perborates, periodates, persulfates, permanganates, chromates, dichromates, nitrates, nitrites, peroxides, ketone peroxides, peroxy acids, inorganic acids, and combinations thereof.

The saccharide component preferably includes oligosaccharides, disaccharides, monosaccharides, and combinations thereof, with mono- and di-saccharides being especially preferred.

The functional comonomer units may include suitable monomers such as sulfonic acid units, carboxylic acid units, vinyl amine units, acrylamide units, dimethyl acrylamide units, salts thereof, and combinations thereof.

The polyvinyl alcohol film preferably comprises from 75 to 98 weight percent of the vinyl alcohol copolymer and from 2 to 25 weight percent of the saccharide component.

As mentioned, the films of the invention retain solubility even after exposure to harsh oxidizing agents. Preferably the film exhibits a normalized dissolution time of less than 100 seconds when tested according to the solubility test after being exposed to trichloroisocyanuric acid granules for at least 20 days.

In another embodiment of the invention, there is provided a polyvinyl alcohol film which is resistant to an oxidizing chemical, wherein the film comprises 60-99 wt. percent of a vinyl alcohol copolymer that includes from 0.5 to 20 mole percent of sulfonic acid functional units and/or salts thereof, and from 1 to 40 wt. percent of a saccharide component which includes at least one water soluble saccharide component selected from monosaccharides, disaccharides, and combinations thereof. The sulfonic acid functionalized units preferably include 2-methylacrylamido-2-methyl propane sulfonic acid (AMPS) and/or its sodium salt (NaAMPS) monomers.

There is also provided in accordance with the invention a blended polymer composition which comprises 60 to 99 weight percent of a vinyl alcohol copolymer which includes from 0.5 to 20 mole percent of functional comonomer units, the comonomer units being effective to stabilize the solubility of the composition upon prolonged exposure to an oxidizing chemical, and 1 to 40 weight percent of a saccharide component which includes at least one water soluble saccharide. Likewise, there is provided a method of making a blended polymer composition by providing an aqueous solution of the vinyl alcohol copolymer and dissolving the saccharide component in the aqueous solution.

In another aspect of the invention, there is included a unit-dose package which comprises a polymeric dissolution packet and an oxidizing chemical substance which is sealed therein. The dissolution packet has a film which includes 75-98 wt. percent of a vinyl alcohol copolymer which has from 0.5 to 20 mole percent of functional comonomer units, and from 2 to 25 wt. percent of a saccharide component which has at least one water soluble saccharide. The functional comonomer unit and the saccharide component are selected and included such that the film has elevated water solubility after like exposure to the oxidizing chemical as compared with either (1) a like film made with a like vinyl alcohol resin having no comonomer units, or (2) a like film made without the saccharide component.

In yet another aspect of the invention there is provided a unit-dose package for providing chlorine to water which includes a polymeric dissolution packet and a chlorine containing sanitizing agent enclosed therein. The dissolution packet includes a film that has a vinyl alcohol co-polymer with functional comonomer units which are effective to maintain the solubility of the film upon exposure to a chlorine-containing oxidizing chemical, and a saccharide component. Preferably, the sanitizing agent in the unit-dose package is trichloroisocyanuric acid, salts thereof, hydrates thereof, or combinations thereof.

In still another embodiment of the invention there is provided a unit-dose package for providing chlorine to water where the package includes a polymeric dissolution packet which comprises at least 75 wt. percent of a vinyl alcohol copolymer and one or more components selected from (1) a saccharide component which has a water soluble saccharide, and (2) a chlorine scavenger. The unit-dose package includes a chlorinated isocyanurate compound that is contained in the polymeric dissolution packet. Where included, the chlorine scavenger may be a thiosulfate salt.

In yet another aspect of the invention, there is provided a unit-dose package for providing chlorine to water where the package includes a polymeric dissolution packet with a film which includes a blend of from 75 to 98 wt. percent of a polyvinyl alcohol copolymer and from 2 to 25 wt. percent of a saccharide component which includes at least one water soluble saccharide. A chlorine-containing agent is included in the dissolution packet which may be selected from the group of calcium hypochlorite, dichloroisocyanuric acid, salts thereof, hydrates thereof, or combinations thereof.

Alternate embodiments of the invention follow.

In another aspect of the present invention there is provided a chlorine resistant polymeric film which comprises from 60 to 99 weight percent of a vinyl alcohol copolymer which includes from 0.5 to 20 mol percent of sulfonic acid functionalized units and/or salts thereof, and from 1 to 40 weight percent of a saccharide component which includes at least one water soluble saccharide. The saccharide component may include at least one monosaccharide or disaccharide and preferably includes dextrose.

The polymeric film of the invention typically comprises from 75 to 98 weight percent of the vinyl alcohol copolymer, preferably 85 to 95 weight percent, and from 2 to 25 weight percent of the saccharide component, preferably from 5 to 15 weight percent saccharide component. In some embodiments, the film comprises at least 98 wt. percent of the vinyl alcohol copolymer and saccharide components combined.

The vinyl alcohol copolymer typically includes from 1 to 8 mole percent of polymerized sulfonic acid functionalized monomer units and/or salts thereof, from 1 to 20 mole percent of polymerized vinyl acetate units, and from 78 to 98 percent of polymerized vinyl alcohol units. Other suitable ranges include 2 to 5 mole percent of polymerized sulfonic acid units and/or salts thereof, 1 to 10 mole percent of polymerized vinyl acetate units, and from 85 to 95 mole percent of polymerized vinyl alcohol units. In some embodiments, the sulfonic acid functionalized units include 2-methylacrylamido-2-methyl propane sulfonic acid (AMPS) or the sodium salt thereof (NaAMPS).

The films of the invention may also include additional components such as from 0.25 to 5 wt. percent of a chlorine scavenger. Preferably, though, the film is substantially free of plasticizing agents which adversely affect the film's ability to maintain its solubility after prolonged exposure to oxidizing chemicals.

The films of the invention exhibit significantly improved resistance to chlorine containing chemicals, such that the films have a normalized dissolution time of less than about 100 seconds when measured according to the slide frame solubility test after being exposed to trichloroisocyanuric acid granules for at least 20 days, and preferably have a normalized dissolution time after exposure to trichloroisocyanuric acid granules for at least 30 days, at least 60 days, and even at least 90 days.

The films of the invention may be produced by any suitable means, but are particularly amenable to solution casting processes, melt extrusion processes, or blown film processes.

In another aspect of the invention there is provided a unit-dose package for imparting chlorine to water, where the package comprises a polymeric dissolution packet which has a film that includes a blend of (1) a vinyl alcohol copolymer which has sulfonic acid monomers and/or salts of sulfonic acid monomers, and (2) a saccharide component which includes at least one water soluble saccharide. The unit-dose package includes a chlorine-containing sanitizing agent that is enclosed in the polymeric dissolution packet.

The chlorine-containing sanitizing agent may have an available chlorine content of at least about 30 percent, and the invention is particularly suitable for chlorinated agents with an active chlorine content in the range of from about 85 to 95 percent. The chlorine-containing sanitizing agent may be selected from one or more of the following components: calcium hypochlorite, dichloroisocyanuric acid, trichloroisocyanuric acid, salts thereof, and hydrates thereof. Preferably trichloroisocyanuric acid or its salts or hydrates are included in the unit-dose package. The chlorinated agent may be in any suitable form such as granules, powder, liquid, gel, or tablet.

Among desirable features, the chlorine resistant films of the invention provide for chlorine packets that exhibit (1) high water solubility; (2) long shelf life; and (3) little or no discoloration.

Still other features and advantages will become apparent from the discussion which follows.

BRIEF DESCRIPTION OF DRAWINGS

The invention is described in detail below with reference to the Figures in which:

FIG. 9 is a graph showing the solubility results of comparative films which contain plasticizers after being exposed to calcium hypochlorite; and FIG. 10 is a graph showing the solubility results of films of the invention which contain a chlorine scavenging agent.

DETAILED DESCRIPTION OF THE INVENTION

Figure 1:
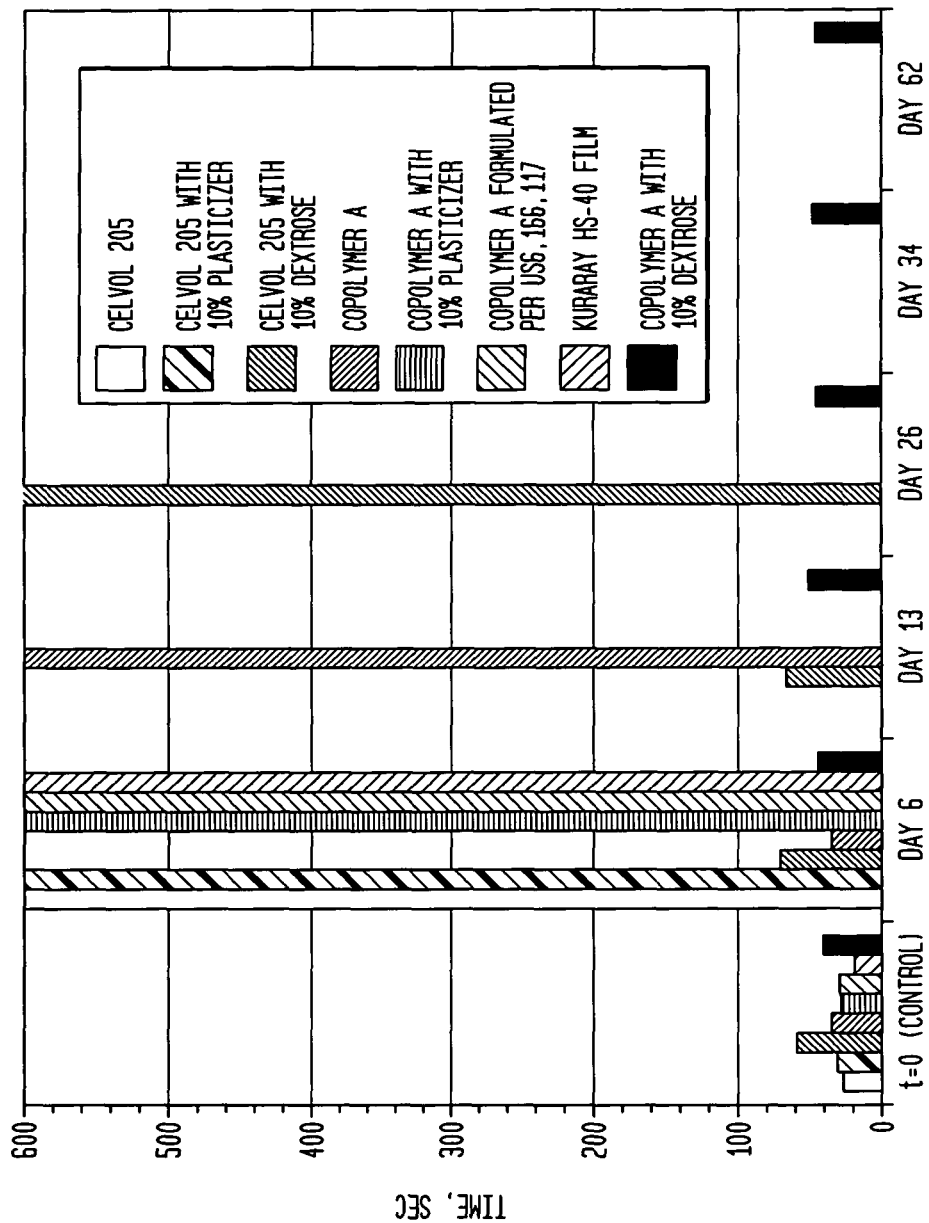
FIG. 1 is a graph showing the results of a trichlor solubility test on comparative films and on films of the invention.

The invention is described in detail below in connection with numerous embodiments for purposes of illustration only. Modifications to particular embodiments within the spirit and scope of the invention, set forth in the appended claims, will be readily apparent to those of skill in the art.

As used herein, terminology has its ordinary meaning unless modified or supplemented by definition. "Percent" and the like means weight percent unless mole or volume percent is specified. In connection with chemical terminology, specific definitions to be used throughout the specification and claims follow.

"Characteristic Viscosity" of a resin is measured in 4% aqueous solution (w/w) at 20° C.

"PVOH/AMPS copolymer", "PVOH-co-AMPS" and like terminology means hydrolyzed copolymers of VAM and AMPS as described herein.

The "normalized disintegration time" refers to the normalized time it takes for a sample of film to break when tested according to the slide frame test described in detail below. The normalized value is the average of two samples and is normalized to a film thickness of 76 μm (when the film thickness is not 76 μm) according to the following:

$$\text{Normalized Disintegration Time} = (\text{Average Disintegration Time}) \times \left(\frac{76 \ \mu m}{\text{Actual Film Thickness } \mu m}\right)$$

The "normalized dissolution time" is defined as the normalized time it takes for a sample of film to dissolve completely in the slide frame test described below, such that no residual strands or particles of film remain on the frame. The normalized value is the average of two samples and is normalized to a film thickness of 76 μm (when the film thickness is not 76 μm) according to the following:

$$\text{Normalized Dissolution Time} = (\text{Average Dissolution Time}) \times \left(\frac{76 \ \mu m}{\text{Actual Film Thickness } \mu m}\right)$$

The water-soluble film formulation useful in the present invention includes a polyvinyl alcohol resin component and a saccharide component and/or a chlorine scavenging component. The polymer composition used in the films primarily includes the PVOH resin component which is generally a copolymer of vinyl alcohol and functional comonomer units, where the functional comonomer units are effective to stabilize the solubility of the film when exposed to oxidizing chemicals.

The functional comonomer units in the vinyl alcohol resin may include any monomers which preserve the solubility of the film after exposure to the oxidizing chemical, i.e., the comonomer units are selected to provide the film with elevated solubility after like exposure to the oxidizing chemical as compared to a like film which is made from a like vinyl alcohol resin (degree of polymerization, degree of hydrolysis, etc.) with no functional comonomer units. Non-limiting examples of the functional comonomer units include hydrophilic monomers such as sulfonic acid units, carboxylic acid units, vinyl amine units, acrylamide, dimethylacrylamide, salts thereof, and combinations thereof. The functional monomer may be present in the copolymer in amounts of from 0.5 to 20 mole percent, with preferred ranges being from 1 to 10 mole percent, or from 2 to 6 mole percent.

Sulfonic acid functionalized PVOH resins are most preferred. Examples of the sulfonic acid monomer units and/or salts thereof include vinyl sulfonic acid, allyl sulfonic acid, ethylene sulfonic acid, 2-acrylamido-1-methylpropanesulfonic acid, 2-methacrylamido-2-methylpropanesulfonic acid, 2-sulfoethyl acrylate, salts thereof, and combinations thereof. Most preferred is 2-acrylamido-2-methylpropanesulfonic acid which is referred to herein as "AMPS". If the salt of the free acid is used it may include sodium, potassium, or ammonium salts, among others. The sodium salt of AMPS is referred to herein as "NaAMPS."

In some embodiments, additional comonomers (i.e., other than the vinyl acetate and the functional comonomer units) may be included in amounts up to about 10 mole percent. Suitable comonomers may include, for example, (meth)acrylates; an olefin such as ethylene, propylene, or butylenes; VEOVA™ type vinyl ester monomers such as VEOVA™10 vinyl esters; and combinations thereof. However, preferably the vinyl alcohol copolymer is 98+% derived from VAM and the functional comonomer acid units.

Various methods of polymerizing vinyl acetate copolymers may be used as are known in the art. Where the functional monomer is sulfonic acid-type units, the resin may be produced by a unique process which is described in copending US Patent Application Publication Nos. 2005/0222355 (now U.S. Pat. No. 7,786,229) and 2005/0065272 (now U.S. Pat. No. 7,790,815), as well as in U.S. Pat. No. 6,818,709, all to Vicari, the entireties of which are herein incorporated by reference.

US Patent Application Publication No. 2005/0222355 further describes preparation of a film from an aqueous solution of polymer. The film is made with no additional additives such as propyl gallate.

Where sulfonic acid comonomer units are used, the saponified copolymer of vinyl alcohol and sulfonic acid component may have, for example, about 1 to about 8 mole % of polymerized sulfonic acid component or salt thereof, about 1 to about 20 mole % of polymerized VAM (PVAc), and about 75 to about 98 mole % of polymerized vinyl alcohol (PVOH), preferably about 2 to about 4 mole % of polymerized sulfonic acid component, about 5 to about 10 mole % of PVAc, and about 85 to about 95 mole % of PVOH. The amount of each polymerized repeating unit is generally determined by $C^{13}$NMR analysis. The copolymer may have a degree of hydrolysis of, for example, about 70 to about 99+ %, preferably about 80 to about 95% as indicated by $C^{13}$NMR, and a relative molecular weight indicated by a characteristic viscosity of, for example, about 2 to 50 cps, about 3 to about 30 cps, preferably about 7 to about 10 cps.

Commercially available vinyl alcohol/sulfonic acid copolymers that are suitable for use in the present invention may include PVOH/AMPS copolymers that include about 3.5 to 4 mol percent of AMPS monomer and which have a degree of hydrolysis of about 98 to 99 percent, based on the mole percent of hydrolyzed acetate units. In the discussion which follows, these commercially available PVOH/AMPS resins having the foregoing characteristics were used, one having a relatively lower viscosity (Copolymer A) and one of relatively higher viscosity (Copolymer B).

Water Soluble Film Formulation

The water soluble film formulation used in the invention generally includes a blend of vinyl alcohol copolymer and a saccharide component. The saccharide component includes at least one water soluble saccharide, i.e., has a solubility in water at 25° C. of at least 0.1 moles per liter. The saccharide component may include polysaccharides, oligosaccharides, disaccharides, monosaccharides, or combinations thereof. Non-limiting examples include glucose (dextrose), galactose, sucrose, fructose, lactose, maltose, mannose, trehalose, and combinations thereof. The saccharide component is preferably a mono- or di-saccharide, and is preferably crystalline; most preferably the saccharide component includes dextrose.

The film formulations of the invention generally include primarily the vinyl alcohol component. The saccharide component may be present in amounts of from 1 to 40 weight percent. More typically, the film formulations include from about 2 to 25 or 5 to 15 weight percent.

The films may further include a chlorine scavenger in amounts of from 0.25 to 5 weight percent, preferably 0.5 to 2.5 weight percent. Suitable chlorine scavengers may include thiosulfate salts such as sodium thiosulfate.

Additional chlorine scavengers may include the following polymers which can be divided into four groups according to their structural construction: polyethylene imines, polyamines, polyamineamides and polyacrylamides, of which the polyethyleneimines, the polyamines and polyamineamides are especially preferred. Other chlorine scavengers herein are anions selected from the group consisting of reducing materials like sulfite, bisulfite, thiosulfite, thiosulfate, iodide, nitrite, etc. and antioxidants like carbamate, ascorbate, etc. and mixtures thereof. Conventional non-chlorine scavenging anions like sulfate, bisulfate, carbonate, bicarbonate, nitrate, chloride, borate, phosphate, condensed phosphate, acetate, benzoate, citrate, formate, lactate, salicylate, etc. and mixtures thereof can be used with ammonium cations. Further exemplary chlorine scavengers include ammonium sulfate (preferred), and primary and secondary amines of low volatility such as ethanolamines, amino acids and their salts, polyamino acids and their salts, fatty amines, glucosamine and other aminated sugars. Specific examples include tris(hydroxymethyl) aminomethane, monoethanol amine, diethanol amine, sarcosine, glycine, iminodiacetic acid, lysine, ethylenediamine diacetic acid, 2,2,6,6-tetramethyl piperinol, and 2,2,6,6-tetramethyl piperinone. In some embodiments of the invention, the chlorine scavenging agent may be included with the vinyl alcohol copolymer without the saccharide component.

Other components may also be added to the films of the invention. For example, minor amounts of plasticizing agents may be included. As used herein, "plasticizers" refers to any of those generally used as plasticizers for PVOH resins, excluding the saccharide component of the invention (the inclusion of the saccharide component may have some plasticizing effect on the film). Specific examples of plasticizers include polyethylene glycol (PEG), trimethylene glycol, propylene glycol, 2,2,4-trimethyl-1,3-pentanediol, pentaerythritol, or glycerine. However, it has been discovered in connection with the present invention that certain plasticizers may have a substantial negative effect on film solubility when the films are exposed to aggressive oxidizing agents such as chlorinated isocyanurates; examples of these types of plasticizers may include glycerol. Thus, when used to package highly oxidative substances, the films of the invention preferably contain less than 2 weight percent plasticizers which negatively affect the solubility of the film after exposure to oxidizing agents, and, in some embodiments, the films are substantially free of these types of plasticizers, i.e., less than about 0.5 weight percent. In this regard, the films of the invention are also surprising in that they exhibit many of the properties of plasticized PVOH films, such as flexibility in low humidity environments and high film integrity, but without degrading the solubility of the films when exposed to chlorinated sanitizing chemicals.

The film formulation may also include other additives in minor amounts such as biocides, fillers, extenders, antiblocking agents, anti-slipping agents, detackifying agents, antifoaming agents, UV stabilizers, lubricants, release agents, pigments, dyes, as well as any other known additives in the polymer arts.

The water soluble films generally comprise at least 95 wt. percent of the vinyl alcohol copolymer/saccharide combination, and preferably comprise at least 98 wt. percent of the copolymer/saccharide combination.

Film Production

The components of the film formulation may be blended together prior to film fabrication by any suitable means. Preferably, the saccharide component and/or chlorine scavenger is dissolved in an aqueous solution of the vinyl alcohol polymer, and blended therewith.

The method of producing the water soluble films of the invention is not particularly limited. Suitable film forming methods may include film casting, wet process film formation, dry process film formation, film extrusion, melting film formation, coating process and blown film methods.

The film formulation of the invention is particularly amenable to solution casting processes. An aqueous solution of the film is prepared at about 10 to 30 percent solids by weight. The solution is then added to a trough on a metal forming belt and a doctor blade spreads the solution out on the belt to a predetermined thickness. The belt is then passed through an oven to evaporate the water, which dries the film to a moisture content of about 6 to 15%. Desirably, the polymer films are fabricated to thickness in ranges of from about 10 to 200 μm, 20 to 150 μm, or 50 to 100 μm.

Film Applications

The water soluble films produced with the copolymers of the invention are useful for any purpose wherein water-solubility is an advantage. As noted earlier, the inventive films are particularly suitable for unit-dose packaging of oxidizing chemicals which may be found in agricultural chemicals, microbiocides and the like, where the chemicals in packaged form are placed into water so that the contents are dissolved or dispersed in the water. This is accomplished without the necessity of the user directly touching harmful chemicals, and without the need to measure the chemicals because the unit-dose is already packaged. Non-limiting examples of suitable oxidizing chemicals include peroxides such as barium peroxide, sodium carbonate peroxide, calcium peroxide, hydrogen peroxide, lithium peroxide, magnesium peroxide, strontium peroxide, zinc peroxide, and sodium peroxide; ketone peroxides such as acetone peroxide, methyl ethyl ketone peroxide, and benzoyl peroxide; nitrates such as aluminum nitrate, potassium nitrate, silver nitrate, calcium nitrate, sodium nitrate, cupric nitrate, lead nitrate, magnesium nitrate, strontium nitrate, nickel nitrate, and guanidine nitrate; nitrites such as sodium nitrite; chromates and dichromates such as potassium dichromate, sodium dichromate, and ammonium dichromate; persulfates such as ammonium persulfate, potassium persulfate and sodium persulfate; perborates such as sodium perborate; perbromates and bromates such as potassium bromate and sodium bromate; permanganates such as potassium permanganates, sodium permanganate, and ammonium permanganate; chlorates and perchlorates including barium chlorate, calcium chlorate, sodium perchlorate (monohydrate), strontium chlorate, magnesium perchlorate, zinc chlorate, sodium chlorate, ammonium perchlorate and potassium chlorate; periodates such as sodium periodate and potassium periodate; chlorites and hypochlorites such as lithium hypochlorite, calcium hypochlorite, and sodium chlorite; chlorinated and/or brominated isocyanurates such as sodium dichloroisocyanuric acid, potassium dichloroisocyanuric acid, and trichloroisocyanuric acid; inorganic acids such as nitric acid, chromic acid, and perchloric acid; peroxy acids such as meta-chloroperoxybenzoic acid; bromine, chlorine, iodine and fluorine; potassium superoxide; hydrates of any of the preceding; and combinations of any of the preceding.

The films of the invention are particularly suitable to produce unit dose packaging for sanitizing chemicals such as those used to disinfect pools, spas, and potable water. Sanitizing chemicals include chlorine-containing compounds which produce hypochlorous acid when contacted with water. Hypochlorous acid is the effective sanitizing agent, and the amount of hypochlorous acid which can be produced by a sanitizing chemical relative to chlorine gas ($Cl_2$) is referred to as "available chlorine content." The sanitizing agents may be provided as powder, granules, tablets, liquid, gel, or any other suitable form.

Sanitizing agents include hypochlorite salts such as sodium hypochlorite, calcium hypochlorite, and lithium hypochlorite; chlorinated isocyanurates such as dichloroisocyanuric acid (also referred to as "dichlor") and trichloroisocyanuric acid (also referred to as "trichlor"). Salts and hydrates of the sanitizing compounds are also contemplated. For example, dichloroisocyanuric acid may be provided as sodium dichloroisocyanurate, sodium dichloroisocyanurate acid dihydrate, among others. The structures for trichloroisocyanuric acid and dichloroisocyanuric acid are illustrated below.

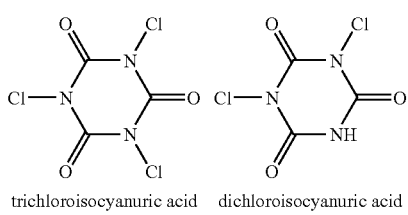

trichloroisocyanuric acid    dichloroisocyanuric acid

As noted above, conventional water soluble PVOH films have a tendency to degrade in the presence of chlorinated sanitizing agents and other oxidative chemicals. Excessive oxidation causes the films to become insoluble in water, thus making them ineffective for unit-dose packaging agents. Without intending to be bound by theory it is believed that the hypochlorite ions produced by the sanitizing agents oxidize the pendant —OH moieties in the PVOH copolymer film, creating carbonyl groups on the polymer backbone. Additionally, hydrochloric acid produced by the sanitizing agent may react with the hydroxyl group to create unsaturated bonds in the polymer backbone which causes discoloration in the film. In either event, the removal of the pendant —OH groups makes the films increasingly insoluble in water. Schematic diagrams of these reactions are shown below for purposes of illustration:

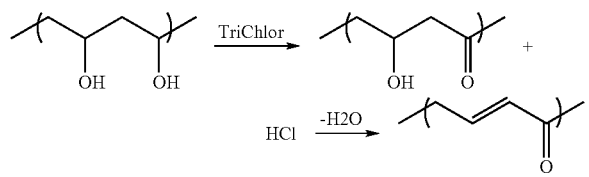

The solubility of the films is determined according to the following slide frame test. Films are prepared from the formulation by casting a 7% aqueous solution onto a glass plate, which is leveled by gravity and allowed to dry to a moisture content of from about 6 to 15% which may take from 2 to 7 days. An amount of the solution is added to the plate to provide for a film with a target thickness of about 76 μm. The water in the solution is allowed to evaporate, and the resulting films are cut into an approximately 2"×4" rectangle. The rectangle is then folded in half and three sides of the film are heat-sealed using a hand held heat-sealing gun. The resulting pouch is then filled with 15-20 grams of chemical in granular form and the fourth side of the pouch is heat sealed. The filled pouches are stored side-by-side in low density polyethylene bags between blue paper towels (to check for bleaching). One pouch is tested in the slide frame solubility test (below) for t=0 data point. The remaining packages are stored at indoor ambient conditions such that the temperature may vary from about 20-25° C., and the relative humidity may vary from about 40 percent to about 70 percent. The packages are stored for a predetermined time, wherein the package is cut open and the chemical is removed. The film thickness is measured, and the film is tested for solubility in the following slide frame test.

Figure 2:
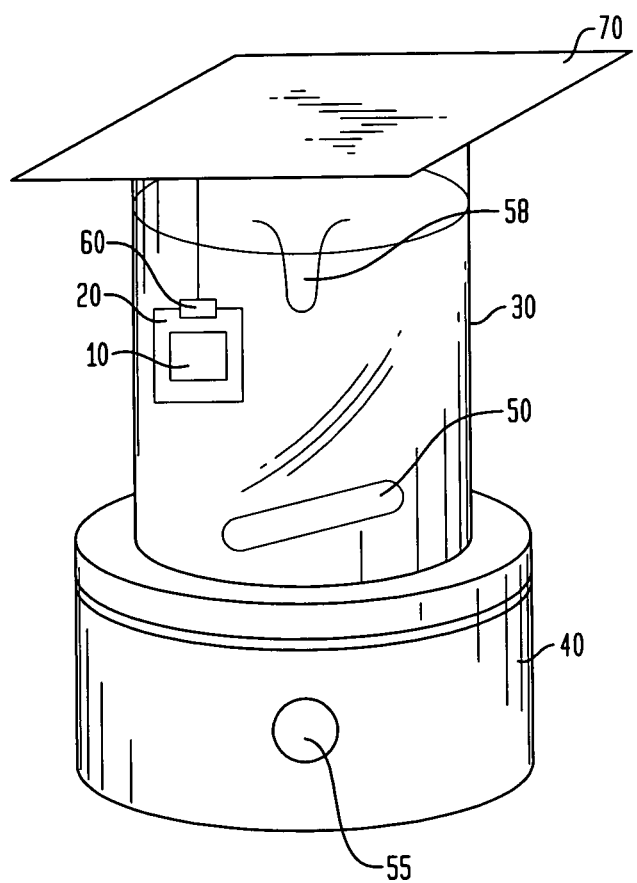
FIG. 2 is a perspective view of the slide frame test apparatus used to evaluate the water solubility of film samples.

Referring to FIG. 2, a 2.3×3.4 cm sample of film 10 is mounted in a slide frame 20 and placed in a 500 ml beaker 30 filled with 400 ml water. The beaker is placed on a magnetic stirrer 40, and the water is stirred with a magnetic stir bar 50 at 400 rpm set by control knob 55, such that a vortex 58 is created. The water temperature is maintained at 21° C.+/−1° C. The frame is secured in the beaker with a clamp 60 which is supported by platform 70 such that stirring water pushes against the film. The film begins to balloon or wave. The disintegration time is recorded when the film balloon bursts. After disintegration, the frame remains in water and the dissolution time is recorded as the total time (inclusive of disintegration time) when no residual strings of film and no film particles remain on the frame. An average of two samples is taken for each measurement, and the values are normalized to a film thickness of 76 μm, if different from 76 μm. As used herein, the phrase "solubility test" refers to the above described assay when the packet samples are prepared with 15-20 g of the indicated sanitizing agent and exposed for the indicated amount of time. Generally, the test is performed using trichloroisocyanuric acid granules or 3 inch tablets, which have about 90% available chlorine.

Figure 3:
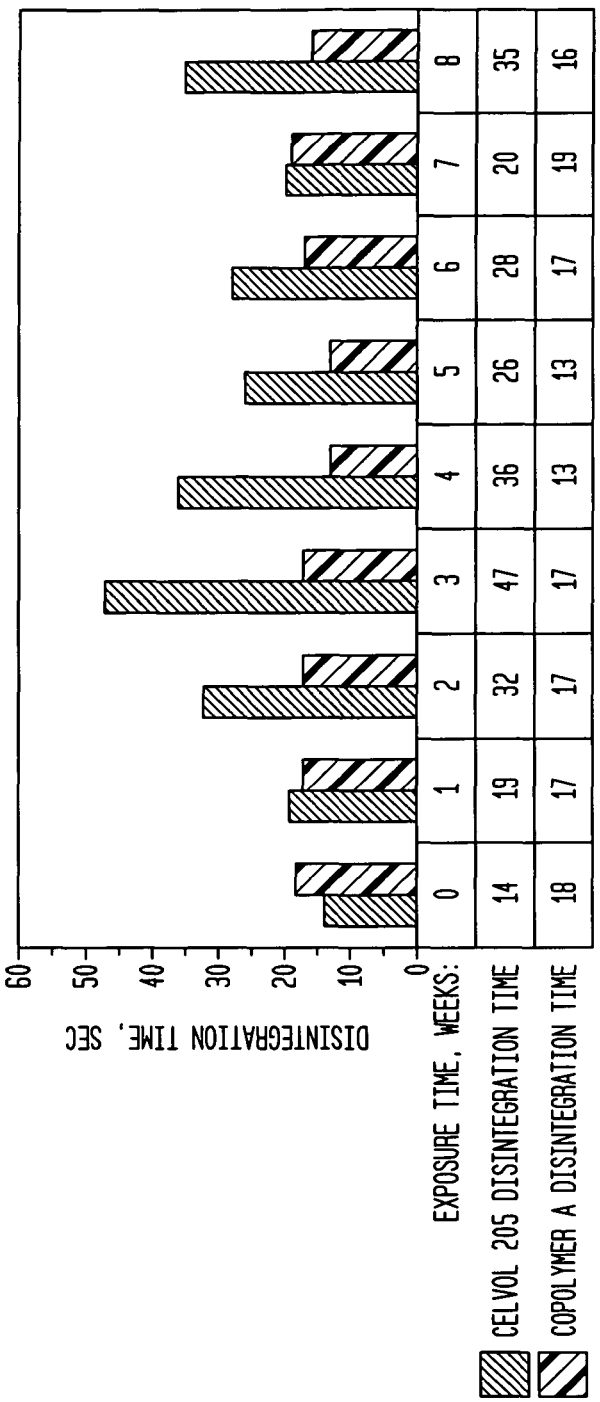
FIG. 3 is a graph showing the disintegration results for a comparative film which consists of a PVOH/AMPS copolymer after exposure to calcium hypochlorite, where it is seen that the PVOH/AMPS films show acceptable disintegration times for calcium hypochlorite.
Figure 4:
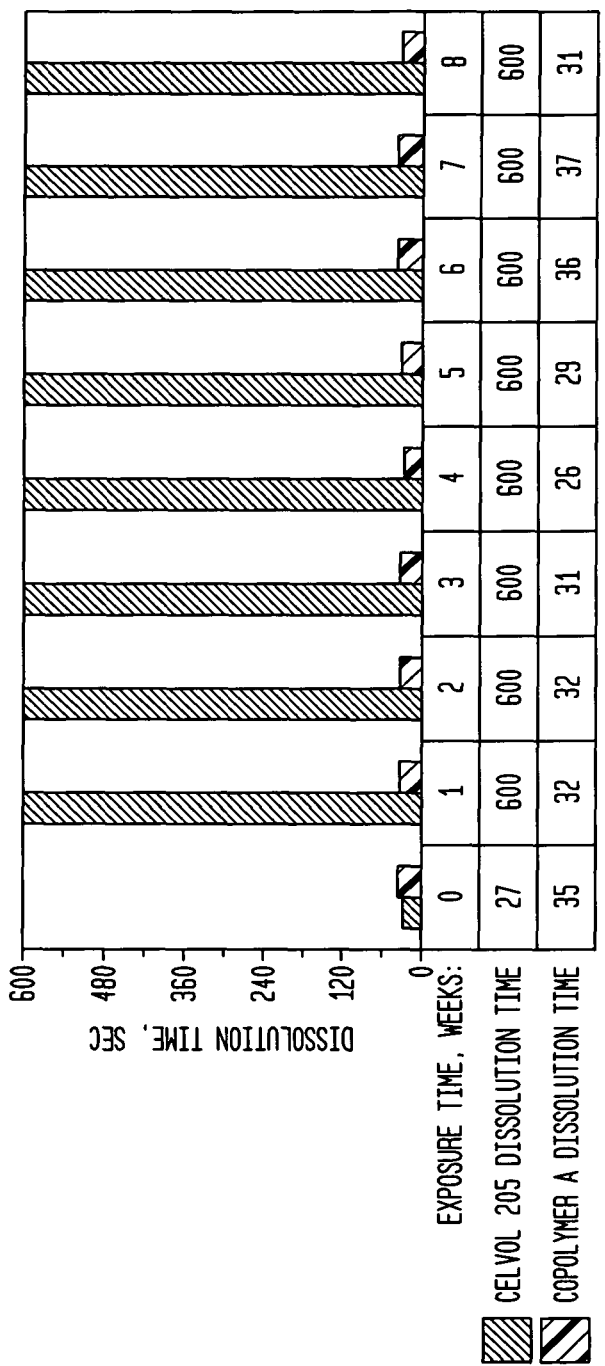
FIG. 4 is a graph showing the dissolution results for a comparative film which consists of a PVOH/AMPS copolymer where it is seen that the PVOH/AMPS films show acceptable dissolution times for calcium hypochlorite.
Figure 5:
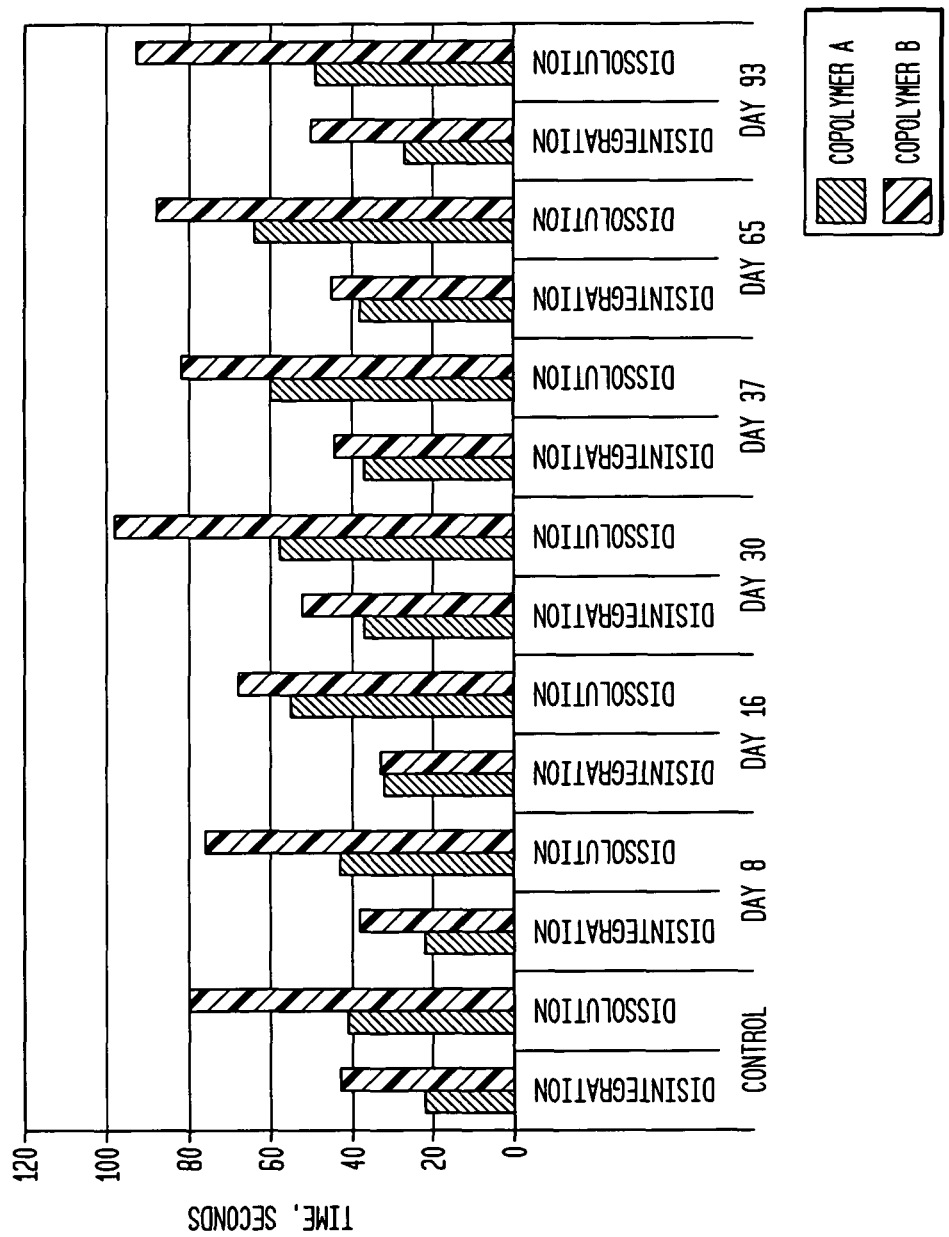
FIG. 5 is a graph showing the disintegration and dissolution results for two PVOH/AMPS films which show acceptable solubility results for both copolymer grades.

Innovation in film formulation has somewhat ameliorated the above mentioned difficulties for sanitizing agents which have low levels of available chlorine content, for example, FIG. 3 (disintegration data) and FIG. 4 (dissolution data) illustrate the solubility results of comparative PVOH films when tested according to the above procedure using calcium hypochlorite with an available chlorine content of about 53 percent. As can be seen, a film which consists of a PVOH/AMPS copolymer has substantially better resistance to calcium hypochlorite than a standard PVOH film (no sulfonic units), particularly with respect to dissolution times. FIG. 5 shows the dissolution/disintegration data of two PVOH/AMPS films, using copolymers of different characteristic viscosities. As can be seen from FIG. 5, both grades of resin exhibited acceptable solubility after exposure to calcium hypochlorite, with the lower characteristic viscosity grade PVOH/AMPS Copolymer A showing only slightly better results.

Notwithstanding these improvements, sanitizing agents with higher levels of available chlorine content cause most films to become insoluble after only short periods of exposure. It would be desirable to use sanitizing agents with high levels of available chlorine content because they are more effective sanitizers; less chemical needs to be added to the water and the pH of the water may not be affected as much. The available chlorine content for some common sanitizing agents is shown in Table 1, below:

TABLE 1

| Sanitizing Agent | Available Chlorine |
| --- | --- |
| Liquid Chlorine (Aqueous Sodium Hypochlorite Solution) | 9-15% |
| Lithium Hypochlorite | About 35% |
| Calcium Hypochlorite | 50-65% |
| Sodium dichloroisocyanurate dihydrate (granular) | About 56% |
| Sodium dichloroisocyanurate (granular) | About 62% |
| Trichloroisocyanuric acid (tablet) | About 90% |

While the inventive films may be used with any sanitizing agent, it has surprisingly been found that the films of the invention are particularly suitable for use as unit dose packaging for strong oxidizing compounds such as chlorinated isocyanurates. Aside from having high levels of available chlorine, the residual isocyanuric acid is very soluble in water and does not cause cloudiness in the water or scaling, as is common with calcium hypochlorite. The toxic nature of chlorinated isocyanurates virtually requires that they be packaged in water soluble unit dose type packaging, whereby the entire package is placed in the water and left to dissolve; this prevents the user from directly handling the toxic chemical, prevents exposure to chemical dust, and negates risk associated with residual chemicals that may be left on a discarded package.

Figure 6:
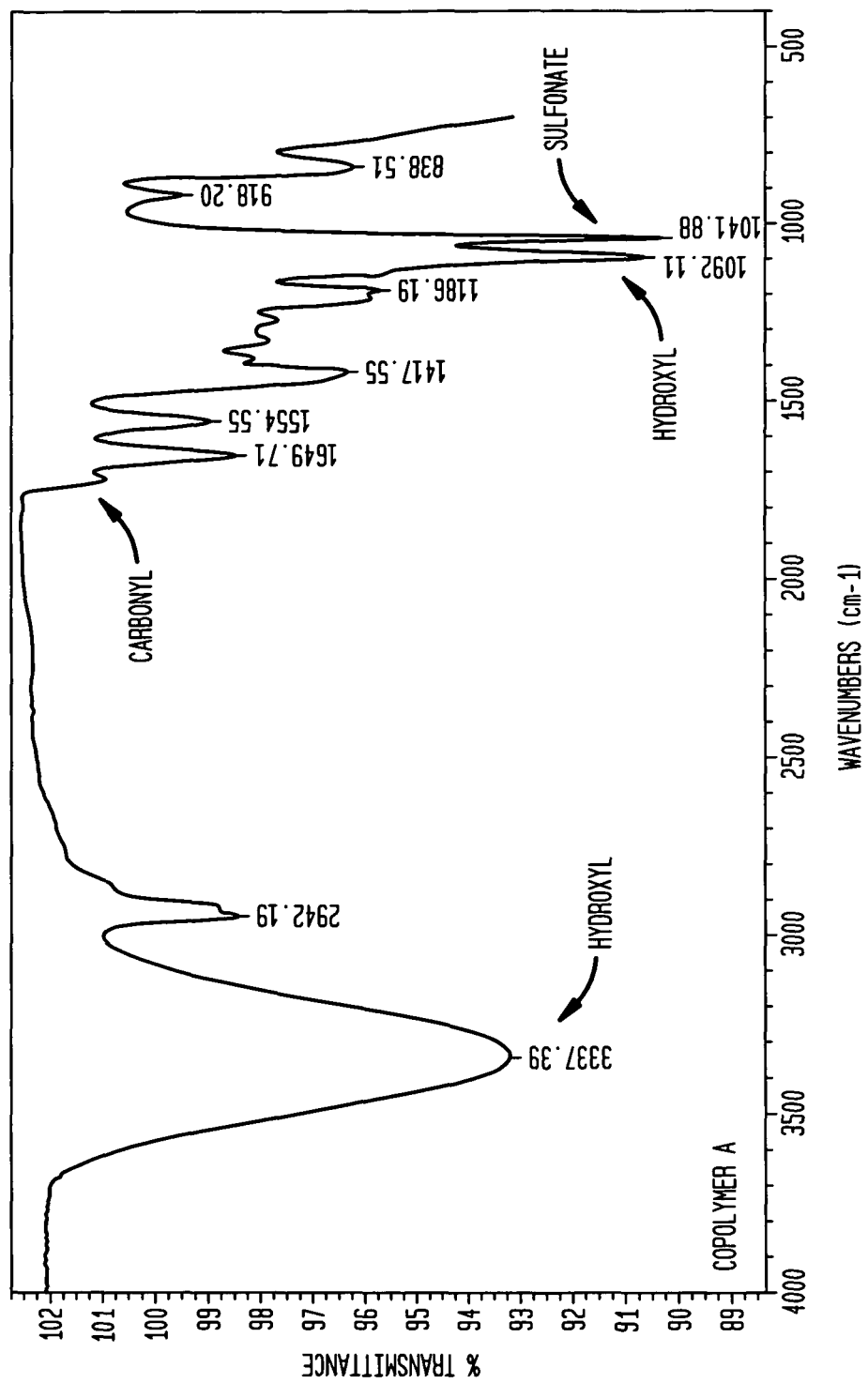
FIG. 6 is an infrared spectra of a comparative film which consists of a PVOH/AMPS copolymer prior to being exposed to chemical agents.
Figure 7:
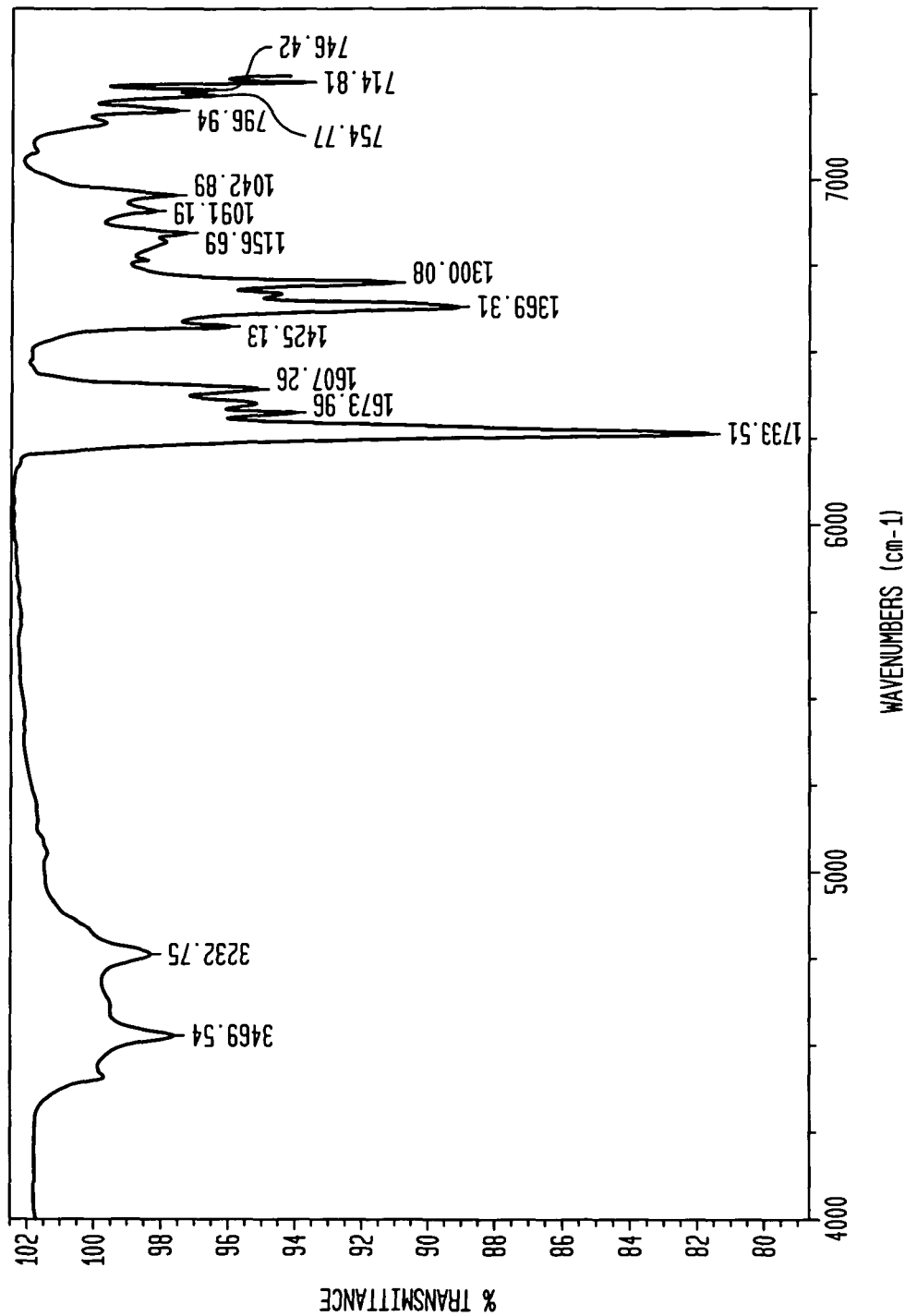
FIG. 7 is an infrared spectra of a comparative film which consists of a PVOH/AMPS copolymer after three weeks exposure to granular trichloroisocyanuric acid, where significant oxidation is evident.
Figure 8:
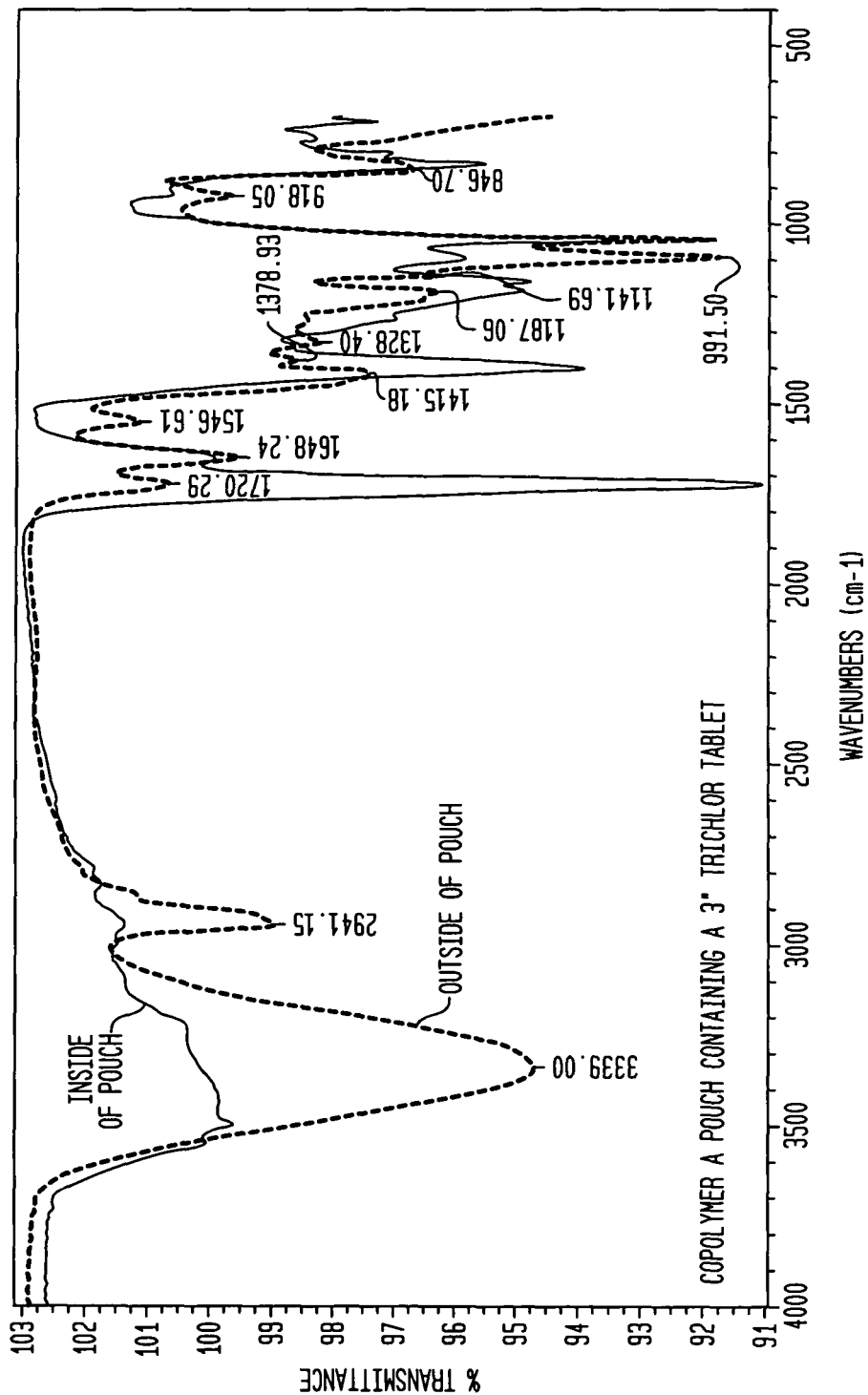
FIG. 8 is an infrared spectra of the inside and outside of a comparative film which consists of a PVOH/AMPS copolymer after seven weeks exposure to trichloroisocyanuric acid tablets, where the inside of the film shows evidence of oxidation.

Trichloroisocyanuric acid is a particularly preferred compound to use as a sanitizing agent because it has an extremely high available chlorine content and, unlike hypochlorite compounds, it does not degrade with UV light. Additionally, trichlor erodes in water at a relatively constant rate, and does not excessively alter the pH of the pool. However, trichlor is particularly corrosive to conventional PVOH based films. The degradative effects of trichlor on conventional PVOH films are further illustrated in FIGS. 6-8 which show the IR spectra of various comparative films. FIG. 6 shows the IR spectra of a film of PVOH/AMPS Copolymer A before exposure to trichlor; the absorption patterns of various moieties are listed. FIG. 7 is an IR spectra of a film of PVOH/AMPS Copolymer A after being exposed to granular trichlor for three weeks. As can be seen in FIG. 7, the broad peak at 3337 cm$^{-1}$ which corresponds to the hydroxyl groups in the polymer is significantly reduced. The two small peaks at 3232 cm$^{-1}$ and 3469 cm$^{-1}$ are indicative of double bond formation in the polymer backbone. Additionally, the sharp peak at 1733 cm$^{-1}$ is indicative of carbonyl formation. FIG. 8 shows the IR spectra of the inside and outside of a film of PVOH/AMPS Copolymer A after having been exposed to a trichlor tablet for 7 weeks. As shown, there is significant evidence of oxidation on the inside of the pouch as compared to the outside of the film. Additionally, even though the outside of the film appears somewhat intact, the oxidation on the inside of the film was substantial enough in this case that the film did not exhibit acceptable solubility properties.

Eight films were tested for slide frame solubility test noted above, after prolonged exposure to trichloroisocyanuric acid granules. The film samples include (1) a film which consists of an unmodified polyvinyl alcohol resin (Celvol® 205; 87-90% hydrolyzed; characteristic viscosity 5.2-6.2); (2) A film consisting of Celvol® 205 and 10 parts of plasticizer per 100 parts of Celvol®; (3) A film consisting of Celvol® 205 and 10 parts of dextrose per 100 parts Celvol®; (4) a film consisting of PVOH/AMPS Copolymer A; (5) a film consisting of PVOH/AMPS Copolymer A with 10 parts of plasticizer per 100 parts of the PVOH/AMPS Copolymer A; (6) a film comprising PVOH/AMPS Copolymer A that was formulated according to example 2 of U.S. Pat. No. 6,166,117; (7) a commercially available sulfonic acid modified PVOH film (Kuraray HS-40); and (8) a film comprising PVOH/AMPS Copolymer A with 10 parts dextrose per 100 parts of the PVOH/AMPS Copolymer A. The disintegration times and dissolution times for films 1-8 are reported in Table 2, below.

The dissolution data taken from the above results are plotted in FIG. 1. As can be seen in FIG. 1, the film which comprised 100 parts PVOH/AMPS Copolymer A with 10 parts dextrose (example 8) exhibited remarkably improved solubility properties after prolonged exposure to trichlor, generally maintaining a disintegration time and dissolution time of less than 100 seconds after 20 days of exposure, after 30 days, and even after 60 days of exposure. In contrast it can be seen that a PVOH film alone and a film of 100 parts PVOH resin with 10 parts plasticizer deteriorated in less than 1 week of exposure to the trichlor. The film consisting of PVOH/AMPS became insoluble as early as day 13. The PVOH/AMPS film with 10 parts plasticizer performed even worse, and failed at day 6. The commercially available sulfonic acid modified PVOH film, Kuraray HS-40, and the film that was formulated according to Example 2 of U.S. Pat. No. 6,166,117 also did not perform well, both failing on day 6.

The chlorine resistance of the saccharide-containing PVOH/AMPS films is quite surprising, especially considering that films which consist of PVOH/AMPS polymers exhibit negligible resistance to trichlor, yet maintain acceptable solubility when exposed to sanitizing agents such as calcium hypochlorite. It is additionally unexpected that the PVOH plasticizers have a significant negative effect on film solubility when exposed to trichlor, because the plasticizers do not appear to be particularly problematic when PVOH/AMPS films are exposed to hypochlorite as is shown in FIG. 9 (comparative films).

Interestingly, the film comprising 100 parts of a standard PVOH resin (Celvol® 205) with 10 parts dextrose showed the second best results, and did not exhibit total insolubility until day 26. It is believed that this type of formulation may be useful to package hypochlorite or dichloroisocyanuric acid compounds, which are not quite as oxidizing as trichlor.

The effectiveness of chlorine scavenging agents in the films of the invention was evaluated in the solubility assays reflected in FIG. 10. A film having 100 parts PVOH/AMPS copolymer, 1 part sodium thiosulfate, and 10 parts dextrose exhibited good solubility for at least 27 days after exposure to trichlor. A PVOH/AMPS film with only the sodium thiosulfate compound also appears to provide acceptable solubility after about 4 weeks of exposure.

The films of the invention may be formed into unit-dose packaging by adding a predetermined amount of oxidizing chemical in granular, powder, liquid or tablet form to the film and hermetically sealing the film around the oxidizing chemical to produce a dissolution packet which includes the active chemical agent.

For swimming pool applications, chlorine-containing sanitizing agent which is included in the unit-dose package may

TABLE 2

| | | | | | | | | | | | | |
|---|---|---|---|---|---|---|---|---|---|---|---|---|
| | | | | Exposure to Trichlor granules (days) | | | | | | | | |
| | 0 (control) | | 6 | | 13 | | 26 | | 34 | | 62 | |
| Ex. | Disin. | Dissol. | Disin. | Dissol. | Disin. | Dissol. | Disin. | Dissol. | Disin. | Dissol. | Disin. | Dissol. |
| 1 | 14 | 27 | 600 | 600 | — | — | — | — | — | — | — | — |
| 2 | 17 | 31 | 600 | 600 | — | — | — | — | — | — | — | — |
| 3 | 29 | 60 | 30 | 71 | 30 | 66 | 278 | 720 | — | — | — | — |
| 4 | 18 | 35 | 16 | 36 | 14 | 600 | — | — | — | — | — | — |
| 5 | 15 | 29 | 135 | 600 | — | — | — | — | — | — | — | — |
| 6 | 15 | 30 | 50 | 600 | — | — | — | — | — | — | — | — |
| 7 | 10 | 19 | 600 | 600 | — | — | — | — | — | — | — | — |
| 8 | 22 | 41 | 25 | 45 | 27 | 51 | 24 | 46 | 25 | 49 | 25 | 47 | be calculated to provide a pool with from 1 to 5 ppm of free available chlorine—this typically equates to about 5 g to 400 g of sanitizer. Due to outgassing of the chlorinating chemicals, it may also be necessary to provide the dissolution packet with a plurality of small holes to prevent buildup of chlorine gas in the package.

The inventive unit-dose packs are generally suitable to package chlorine-containing sanitizing agents having an available chlorine content of at least about 30 percent, and preferably from 80 to 95 percent. When used to package trichloroisocyanuric acid, the inventive films show surprising stability and generally remain soluble in water after being in contact with the trichlor for a period of at least two weeks and preferably for a period of two months or more.

While the invention has been described in connection with several examples, modifications to those examples within the spirit and scope of the invention will be readily apparent to those of skill in the art. In view of the foregoing discussion, relevant knowledge in the art and references discussed above in connection with the Background and Detailed Description, the disclosures of which are all incorporated herein by reference, further description is deemed unnecessary.

What is claimed is:

1. A unit-dose package for providing chlorine to water, said package comprising:
   a. a polymeric dissolution packet that has a film which includes a blend of:
      i. a sulfonic-acid functionalized vinyl alcohol copolymer;
      ii. a water-soluble saccharide that includes at least one monosaccharide; and
      iii. from 0.25 to less than 5 weight percent of a chlorine scavenger; and
   b. a chlorine-containing sanitizing agent that is enclosed inside the polymeric dissolution packet;
   wherein the film is characterized by solubility that is maintained upon prolonged storage of the package.

2. The unit-dose package according to claim 1, wherein the saccharide component is present in an amount of at least 1 weight percent.

3. The unit-dose package according to claim 1, wherein the water-soluble saccharide is selected from the group consisting of glucose, galactose, fructose, mannose, and combinations thereof 4. The unit-dose package according to claim 1, wherein at least 95 weight percent of the film comprises the vinyl alcohol copolymer/saccharide combination.

5. A unit-dose package for providing chlorine to water, said package comprising:
   a. a polymeric dissolution packet that has a film which includes
      i. at least 75 weight percent of an unmodified vinyl alcohol polymer, and
      ii. from 1 to 25 weight percent of a water-soluble saccharide component including at least one monosaccharide; and
   b. a chlorine-containing sanitizing agent that is enclosed inside the polymeric dissolution packet,
   wherein the chlorine-containing sanitizing agent is selected from the group consisting of trichloroisocyanuric acid, salts thereof, hydrates thereof, and combinations thereof; and
   wherein further the film exhibits a normalized dissolution time of less than 100 seconds as measured according to the slide frame solubility test after contact with trichloroisocyanuric acid granules for a period of at least 2 weeks.

6. The unit-dose package according to claim 5, wherein the saccharide component is present in an amount of from 2 to 25 percent by weight of the film.

7. The unit-dose package according to claim 5, wherein the saccharide component is present in an amount of from 5 to 15 percent by weight of the film.

8. The unit-dose package according to claim 5, wherein the at least one monosaccharide is selected from the group consisting of glucose, galactose, fructose, mannose, and combinations thereof.

* * * * *